United States Patent [19]

Freeny, Jr.

[11] 4,232,317
[45] Nov. 4, 1980

[54] QUANTIZED HYPERBOLIC AND INVERSE HYPERBOLIC OBJECT LOCATION SYSTEM

[76] Inventor: Charles C. Freeny, Jr., P.O. Box 9811, Ft. Worth, Tex. 76107

[21] Appl. No.: 956,579

[22] Filed: Nov. 1, 1978

[51] Int. Cl.$^3$ .............................................. G01S 5/06
[52] U.S. Cl. ......................... 343/112 R; 343/112 TC
[58] Field of Search ........ 343/112 C, 112 R, 112 TC, 343/103

[56] References Cited

U.S. PATENT DOCUMENTS

| | | | |
|---|---|---|---|
| 3,209,357 | 9/1965 | Wyatt ................................ | 343/112 R |
| 3,886,553 | 5/1975 | Bates ................................. | 343/112 R |
| 4,112,421 | 9/1978 | Freeny, Jr. ....................... | 343/112 TC X |

Primary Examiner—Maynard R. Wilbur
Assistant Examiner—Richard E. Berger
Attorney, Agent, or Firm—Dunlap, Codding & McCarthy

[57] ABSTRACT

An object location system wherein signals are transmitted or received via more than one transmit station and wherein the objects receive signals from the transmit stations or transmit signals for reception by the treatment stations within a data base region and wherein location coordinates are established in response to the signals received by the transmit stations or in response to the signals received at the object from the transmit stations at a predetermined number of geographic locations within the data base region by positioning the object receiver or transmitter at each of the predetermined geographic locations. The objects are located within the data base region by comparing location coordinates determined in response to signals received at the transmit stations or in response to signals received at the objects with the established location coordinates.

15 Claims, 5 Drawing Figures

QUANTIZED HYPERBOLIC AND INVERSE HYPERBOLIC OBJECT LOCATION SYSTEM

BACKGROUND OF THE INVENTION

1. Field of the Invention

The present invention relates generally to an object or vehicle monitoring system and, more particularly, but not by way of limitation, to a quantized hyperbolic or inverse hyperbolic object or vehicle location system.

2. Brief Description of the Prior Art

In the past, various systems have been developed for identifying the location of objects such as ships, automobiles or vehicles, for example.

One such prior art system, utilized signpost units. In this type of signpost system, the signpost units were located at various predetermined geographic locations within a monitored area and each signpost unit transmitted a signal encoded with a predetermined signpost code which uniquely identified the particular signpost unit or, in other words, which uniquely identified the location of the particular signpost unit, thereby identifying the geographic location of the vehicle. The signpost unit output signals were received by vehicles traveling within the monitored area and the signpost code encoded in the received signpost unit output signal was utilized to determine the geographic location of the object. Although the signpost system was reliable and accurate, the signpost system did not have the disadvantage of requiring a number of electronic signpost units to be installed at known locations within the monitored area, thereby presenting manufacturing, maintenance and replacement problems and costs.

One other prior art system, utilized signals transmitted by three transmit stations when the signals were received via the object and the location of the object was determined via triangulation techniques. Various location errors have been associated with such triangulation techniques, such location errors being caused by deviations in the radio wave propagation due to inhomogeneous material or loss of signal by the object or vehicle receiver, for example. In connection with this prior art triangulation technique, a number of methods have been developed to correct the location errors, such as the use of signpost units located in signal loss regions and field calibrations used with computer prediction algorithms to correct radio wave propagation related errors. However, the correction methods required knowledge of where the erroneous radio signals were located. Thus, such correcting methods involved considerable costs in attempting to locate all such erroneous signal regions.

DESCRIPTION OF THE PREFERRED EMBODIMENT

Initially, it should be noted that, although the present invention will be described in detail in connection with a Loran-C type of hyperbolic vehicle location system, the system of the present invention can be utilized in connection with any hyperbolic radio frequency system or any inverse hyperbolic radio frequency system or any other radio/transmitter triangulation system. The changes or modification necessary to adapt the present invention to other hyperbolic and inverse hyperbolic radio frequency systems or other radio/transmitter triangulation systems will be apparent to those skilled in the art in view of the detailed description contained herein and thus it is not deemed necessary to describe in detail the application of the present invention to such other systems.

In general, the object monitoring or location system of the present invention is utilized to locate objects, such as vehicles, for example, within a data base region wherein signals are receivable from more than one transmit station. To establish the base location coordinates, a receiver is sequentially located at a plurality of known predetermined geographic locations within the data base region and the signals from the transmit stations are received via a receiver at each of the predetermined geographic locations. Then, each of the geographic locations are identified via a pair of base location coordinates determined in response to the signals received by the receiver at each of the geographic locations from the transmit stations. The location of objects within the data base region is identifiable by comparing the previously determined base location coordinates with received location coordinates determined in response to transmit station signals received by receivers located in the objects.

Figure 1:
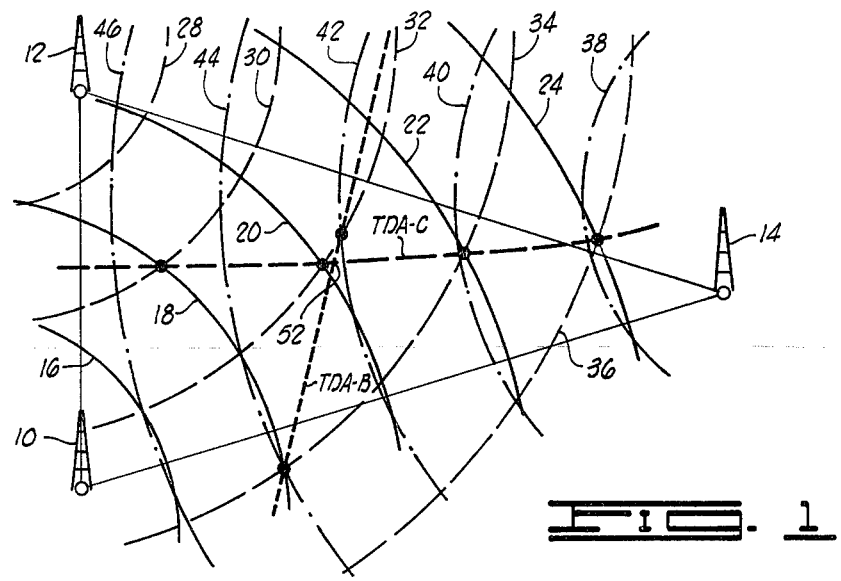
FIG. 1 is a diagrammatic view showing three transmit stations and schematically showing isotime wave propogation lines of the signals transmitted via the three transmit stations, FIG. 1 illustrating some aspects of the system of the present invention.

A typical Loran type of object or vehicle location system is illustrated in FIG. 1 and includes three transmit stations 10, 12 and 14. The transmit stations may sometimes be referred to herein as the first transmit station 10, the second transmit station 12 and the third transmit station 14.

The isotime wave propagation lines produced as a result of the signal transmitted by the transmit station 10 are schematically shown in FIG. 1 and designated therein via the reference numerals 16, 18, 20, 22 and 24. The isotime wave propagation lines produced as a result of the signal transmitted by the transmit station 12 are schematically shown in FIG. 1 and designated therein via the reference numerals 28, 30, 32, 34 and 36. The isotime wave propagation lines produced as a result of the signal transmitted by the transmit station 14 are schematically illustrated in FIG. 1 and designated therein via the reference numerals 38, 40, 42, 44 and 46. In the type of system illustrated in FIG. 1, every geographic location within the data base region (the geographic region or some portion of geographic region wherein signals from the transmit stations 10, 12 and 14 are receivable) has a single pair of values: one value being where the isotime wave propagation lines produced via the transmit stations 10 and 12 generate constant time differences, one such value being diagrammatically illustrated in FIG. 1 via the dashed lines and designated as "TDA-C"; and the other value being where the isotime wave propagation lines produced via the transmit stations 12 and 14 generate constant time differences, one such value being diagrammatically illustrated in FIG. 1 via the dashed lines and designated as "TDB-A". The constant time lines "TDA-C" (only one such line being shown in FIG. 1) being referred to herein simply as "TDA" and the constant time lines "TDB-A" (only one such line being shown in FIG. 1) being referred to herein simply as "TDB". This single pair of values TDA and TDB characterize or identify a particular location within the data base region and the location identified via particular TDA and TDB values in FIG. 1 is designated by the reference numeral 52, the location 52 being where the constant time value lines TDA and TDB cross. In accordance with the system of the present invention, it should be emphasized that location 52 is identified within the data base region via the values TDA and TDB even though the measured values of TDA and TDB are generally different with respect to the theoretical, calculated values of TDA and TDB.

In prior art triangulation systems generally referred to before, the theoretical values of TDA and TDB were calculated assuming a homogeneous smooth earth surface. Thus, the normal procedure was to attempt to correct the measured values using a computer and logic equations based on field measurement results. Utilizing the system of the present invention, it is no longer necessary to make such corrections since the method of the present invention is based on good measured data (data obtained in areas of strong signal strength) and the data obtained in areas of insufficient signal strength is ignored.

Figure 2:
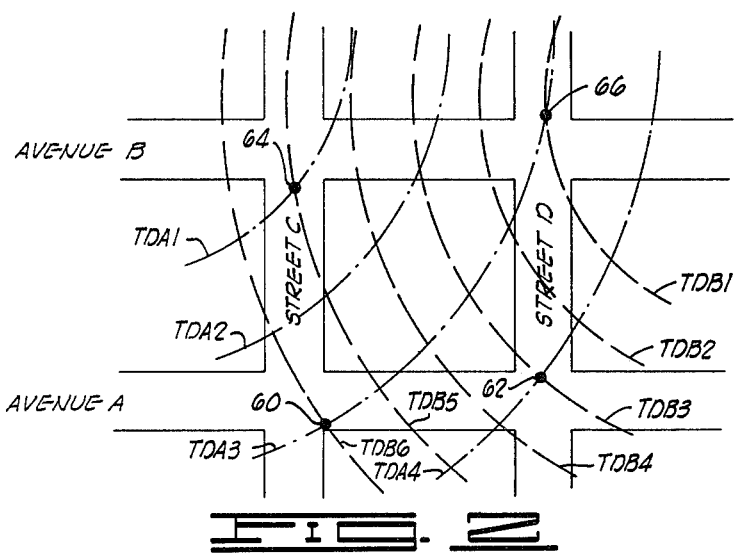
FIG. 2 is a diagrammatic view of a portion of a data base region illustrating some aspects of the system of the present invention.

The method of the present invention is particularly suited for identifying the location of objects such as vehicles traveling along roadways. A portion of a data base region is shown in FIG. 2 wherein two roadways (designated as Avenue A and Avenue B) extend generally perpendicular with respect to two other roadways (designated as Street C and Street D). In the example shown in FIG. 2, Avenue A intersects Street C at an intersection 60, Avenue A intersects Street D at an intersection 62, Avenue B intersects Street C at an intersection 64 and Avenue B intersects Street D at an intersection 66. Further, shown in FIG. 2 are some of the constant time lines TDA and TDB: the constant time lines being more particularly identified in FIG. 2 via the designations TDA1, TDA2, TDA3, TDA4, TDB1, TDB2, TDB3, TDB4, TDB5 and TDB6. As shown in FIG. 2, the location of the intersection of Avenue A and Street C is identified via the location coordinates TDA3, TDB6 (the location or intersection 60 being identified via the intersection of the two constant time lines TDA3 and TDB6); the location or intersection 62 of Avenue A with Street D is identified by the location coordinates TDA4 and TDB3; the location or intersection 64 of Avenue B and Street C being identified by the location coordinates TDA1, TDB5; and the location or intersection 66 of Avenue B and Street D being identified by the location coordinates TDA3, TDB1.

According to the method of the present invention, the various geographic locations within a data base region are identified by sequentially positioning a receiver at each of the geographic locations to be identified within the data base region. When the receiver is positioned at a particular, known geographic location, the signals are received via such receiver from the transmit stations and the values TDA and TDB are determined in response to the received transmit station signals. Referring to the four locations 60, 62, 64 and 66 shown in FIG. 2, for example, a receiver would be first positioned at the geographic location 60 and the transmit station output signals would be received via the receiver positioned at the location 60, the values TDA3, TDB6 being determined in response to the received transmit station signals and stored for future reference. The receiver then is moved from the location 60 and positioned at the location 62 where the values TDA4 and TDB3 would be determined in response to the signals received from the transmit stations via the receiver positioned at the location 62 and stored for future reference. The receiver would then be positioned at the location 66 and the values TDA3 and TDB1 would be determined in response to the signals received from the transmit stations via the receiver positioned at the location 66 and stored for future reference. Finally, the receiver would be positioned at the intersection 64 and the values TDA1, TDB5 would be determined in response to the signals received from the transmit stations via the receiver positioned at the location 64 and stored for future reference. In a similar manner, the values TDA, TDB would be determined for all the desired geographic locations within the data base region.

The TDA and TDB values determined for the predetermined geographic locations in the manner just described with respect to the locations 60, 62, 64 and 66 are referred to herein as the "base location coordinates". The TDA and TDB values determined in response to signals received by a receiver located in a monitored object are referred to herein as "received location coordinates", the received location coordinates being compared with the base location coordinates to determine the location of the object, in a manner to be described in greater detail below.

Thus, the object location system operated in accordance with the present invention does not rely on theoretical, calculated values of TDA and TDB to determine the location of an object. Rather, a vehicle or object monitoring system operated in accordance with the present invention identifies the geographic location of an object using the base locating coordinates TDA and TDB which were determined by actually positioning a receiver at a particular location and determining the base location coordinate values TDA and TDB in response to the signals received from the transmit signals via the receiver actually positioned at the particular geographic location. The measured base location coordinate values TDA and TDB are taken at or near the selected, known geographic location (street, intersection, highway location or the like), and recorded along with the exact geographical description (latitude and longitude or other XY coordinates) for use in the computer location files in a manner to be described in greater detail below. The system of the present invention thus provides the accuracy of the prior art signpost systems, while eliminating the disadvantage of actually hanging a signpost unit at each desired geographic location and the associated disadvantages of maintaining all of the signpost units operational. Further, the system operated in accordance with the present invention eliminates the problems associated with a particular signpost unit becoming non-operational for some reason, since the recorded base location coordinates TDA and TDB utilized to identify the particular geographic locations will remain useable for as long as the transmit stations are maintained or, in other words, for a virtually indefinite period of time. In addition, the method of the present invention retains all of the advantages of the prior art radio frequency triangulation systems while simultaneously eliminating the prior art procedures involving corrections for deviations from theoretical TDA and TDB values or prior art procedures involving the locating of signpost units in areas of insufficient signal strength, for example.

According to the method of the present invention, a predetermined number of geographical locations within the data base region are selected, the exact number being determined primarily depending on the location accuracy desired in a particular application, in lieu of trying to determine and correct an unpredictable number of anomalies and weak signal strength areas as in prior art systems. The good data quantized system of the present invention allows the procedures to be standardized and cost effective versus prior art systems which were highly dependent on the region, city and accuracy requirements. Further, according to the system of the present invention, urban and downtown regions can be made more accurate with respect to outlying areas by recording more base location coordinates per square mile within the downtown or urban regions.

Following the system of the present invention, a particular area such as a city, district, state or other identifiable region, in essence, is quantized into a predetermined number of locations using area maps, accuracy requirements and good signal regions for the quantization criteria to form the data base region. Each quantized location data consists of measured base location coordinates TDA, TDB and the associated geographic identification such as a street intersection name or the latitude and longitude coordinates of the location or both or some other desired geographic identification indicia. The quantized location data is stored in a base station computer and used to determine the quantized vehicle location. The quantized location reported by the vehicle is that location that is the closest to one of the quantized values stored in the computer data base. In one form, the quantized value is determined via a vehicle unit located in the object or vehicle to be located.

Figure 3:
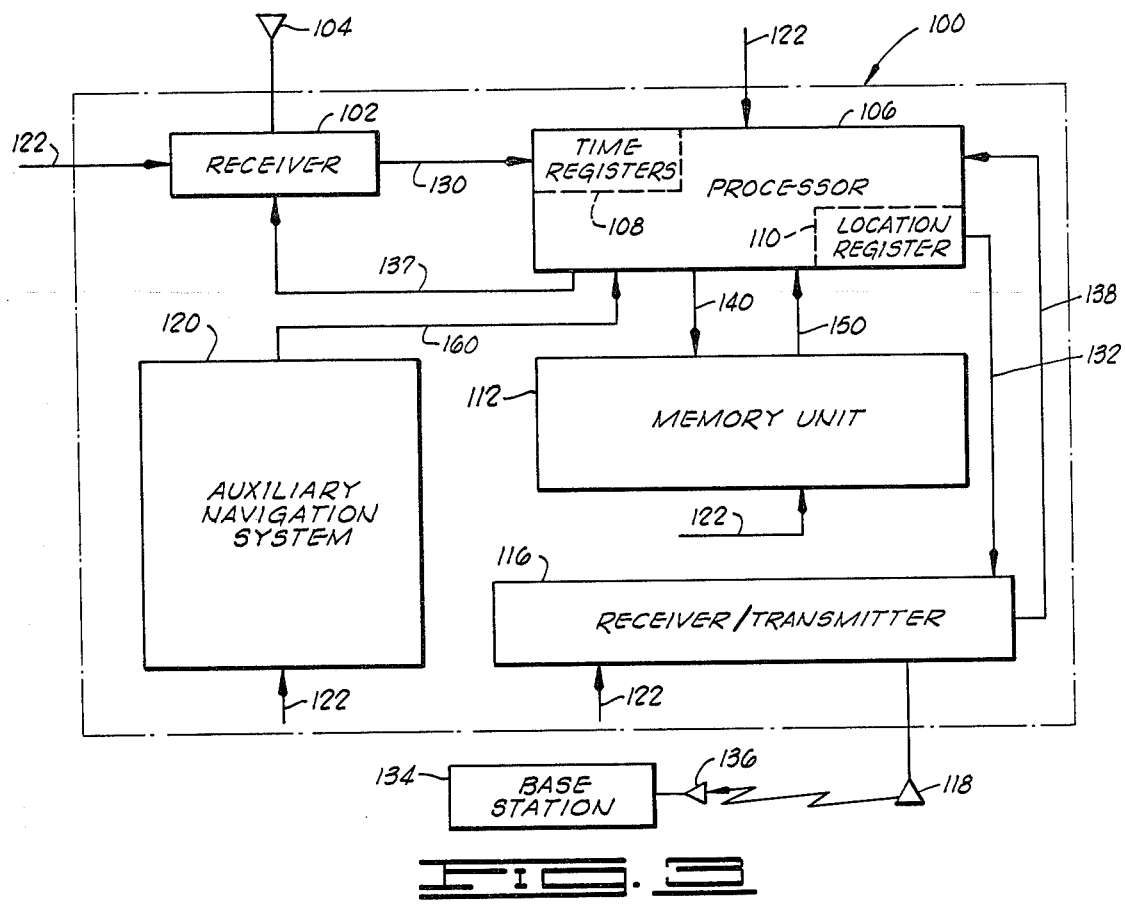
FIG. 3 is a schematic view of a vehicle unit constructed to be operated in accordance with the system of the present invention.

A vehicle unit constructed in accordance with the present invention is shown in FIG. 3 and designated therein via the reference numeral 100. The vehicle unit 100 includes: a receiver 102 which is connected to an antenna 104; a processor 106 which includes a time register 108 and a location register 110; a memory unit 112 which includes data base memory locators and a memory section; a receiver/transmitter 116 which is connected to an antenna 118; and an auxiliary navigation system 120. In one embodiment, the processor 106 is of the type generally referred to in the art as a micro processor and micro processors constructed to be operable in a manner described herein with respect to the processor 116 are commercially available. A power signal is provided on a signal path 122 which is connected to the receiver 102, the processor 106, the memory unit 112, the receiver/transmitter 116 and the auxiliary navigation system 120 for providing operating power to each of these units.

To initially determine the time data comprising the base location coordinates identifying selected, known geographical locations within the data base region, the vehicle unit 100 or a unit constructed like the vehicle unit 100 is physically positioned at each of these predetermined geographic locations. At each selected geographical location, signals from the transmit units are received via the antenna 104 and the receiver 102. The receiver 102 is constructed to receive the transmit signals and to determine the time difference values TDA and TDB, the receiver also determining that the received transmit signals and the corresponding determined time difference values are valid time data. Loran-C type receivers constructed to receive transmit signals, determine time difference values and to determine the time difference values represent valid time data are commercially available and well known in the art and a detailed description of the construction and the operation of such receivers is not required herein.

When the time difference values TDA and TDB are determined via the receiver 102 to represent valid time data, the receiver 102 provides a signal on a signal path 130 indicative of the time difference values TDA and TDB. The signal path 130 is connected to the processor 106 and the signal indicating the time difference values TDA and TDB is received via the processor 106 and the processor 106 operates to store the time difference values TDA and TDB in the time register 108 and the location registers 110.

The time difference values TDA and TDB stored in the location registers 110 are provided via the processor 106 on an output signal path 132 to the receiver/transmitter 116. The receiver/transmitter 116 receives the time difference values TDA and TDB on the signal path 132 and operates to transmit a signal indicating the time difference values TDA and TDB via an antenna 118, the signal transmitted via the receiver/transmitter 116 being received at a base station 134 via a base station antenna 136.

During the initial programming phase of the operation, the location of the vehicle unit 100 within the data base region is known and thus the received time difference values TDA and TDB are stored in a memory unit at the base station 134 as representing the base location coordinates TDA and TDB for the specific, known geographic location of the vehicle unit 100. The base location coordinates TDA and TDB for each of the selected, known geographic locations within the data base region are determined and stored in the memory unit of the base station 134 along with the corresponding geographic location. In this manner, each selected geographic location and the base location coordinates corresponding to each such selected geographic location within the data base region are determined and stored in the memory unit of the base station 134.

Vehicle units like the vehicle unit 100 are installed in each of the vehicles or objects to be monitored and the vehicle units cooperate to identify the geographic location of each monitored vehicle within the data base region during the operation of the present system.

During the operation of the present system to identify the geographic location of vehicles within the data base region, the transmit signals are received via the antenna 104 of the receiver 102 located in the monitored vehicle or object. The received transmit signals are received via the receiver 102 and the receiver 102 operates in the manner described before to determine the time difference values of the received transmit signals and to determine that the time difference values TDA and TDB represent valid time data, the receiver 102 providing the time difference values TDA and TDB via an output signal on the signal path 130.

The valid time data on the signal path 130 is received by the processor 106 and entered into the time register 108 of the processor 106. The processor 106 operates to transfer the valid time difference values TDA and TDB (the received location coordinates) from the time register 108 to the location register 110 and the received location coordinates TDA and TDB are transferred from the location register 110 in the processor 106 to the receiver/transmitter 116 via a signal on the signal path 132. In response to receiving the received location coordinates on the signal path 132, the receiver/transmitter 116 operates to transmit a signal via the antenna 118 to the base station 134, the receiver/transmitter 116 output signal on the antenna 118 being encoded with the received location coordinates TDA and TDB.

The location time coordinates TDA and TDB are received by the base station antenna 136 and the received location coordinates are compared with the previously determined base location coordinates to determine the geographic location of the vehicle unit 100 or, more particularly, the geographic location of the object in which the vehicle unit 100 is located.

The received location coordinates are compared with the previously determined base location coordinates to determine the geographical location of the vehicle unit 100 within the data base region. The comparison between the received location coordinates and the base location coordinates is accomplished via a computer located at the base station 134 in one embodiment and during one aspect of the present system.

Utilizing a computer at the base station 134, the received location coordinates received by the vehicle unit 100 are compared with the previously determined base location coordinates to determine the geographic location of the vehicle within the data base region. Initially, the received location coordinates are compared with each of the previously determined base location coordinates to determine values of RE as follows:

$$[(TDA-TDAI)^2+(TDB-TDBI)^2]^{\frac{1}{2}}=RE \quad (1)$$

wherein: TADI and TDBI are the received location coordinates first received via the vehicle unit 100.

Utilizing the comparison method provided via the expression (1) above, the values of RE are determined using each of the base location coordinates. Then, the smallest value of RE (RES) which is less than a predetermined value RI is determined from the values of RE determined utilizing the expression (1) above. The value RI determines the permissible location error in the particular system.

If it is not possible to determine a smallest value RES which is less than the value RI from the values of RE determined utilizing the expression (1) above, the base station 134 transmits a signal to the vehicle unit 100 encoded with a binary message instructing the vehicle unit 100 processor 106 to transfer another received location coordinate from the time register 108 to the location register 110 for transmitting back to the base station 134 in the manner previously described. In response to receiving this command word, the processor 106 provides a signal on a signal path 137 and the receiver 102 determines different received location coordinates in response to receiving the processor 106 output signal on the signal path 137.

When the smallest value RES of the RI's is determined utilizing the data obtained in accordance with expression (1) above, the base location coordinates TDA and TDB which were utilized in the expression (1) above to determine the value RES are stored in the base station 134 computer (not shown in the drawings), the base location coordinates utilized to determine the value RES being designated as TDAIS and TDBIS and the values TDAIS and TDBIS being stored in the base station 134 computer.

Figure 4:
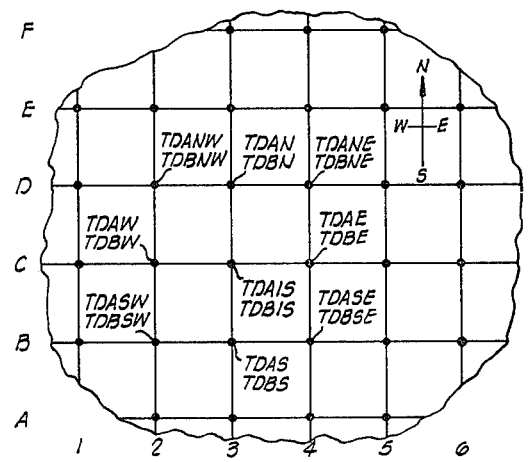
FIG. 4 is a diagrammatic view showing some of the location coordinates utilized in connection with the vehicle data base mask, illustrating some aspects of the system of the present invention.

After the first location coordinates TDAIS and TDBIS have been determined by the base station 134 computer, a data base mask is constructed. The data base mask consists of the first location coordinates TDAIS and TDBIS identifying the geographic location of the vehicle unit 100 in response to the received location coordinates TDAI and TDBI and the location coordinates identifying a predetermined number of the geographic locations immediately surrounding or adjacent the geographic location identified via the location coordinates TDAIS and TDBIS. For example, assuming a data base region as partially shown in FIG. 4, the immediately surrounding or adjacent geographic locations would consist of the geographic locations north, south, east, west, northwest, northeast, southeast and southwest of the geographic location identified via the location coordinates TDAIS and TDBIS. As shown in FIG. 4, the data base mask consists of the location coordinates TDAIS, TDBIS, the location coordinates TDAN, TDBN, (the location coordinates identifying the geographic location north of the geographic location identified via the location coordinates TDAIS and TDBIS), the location coordinates TDANE and TDBNE identifying the geographic location northeast of the geographic location identified via the location coordinates TDAIS and TDBIS, the location coordinates TDAE and TDBE identifying the geographic location east of the geographic location identified via the location coordinates TDAIS and TDBIS, the location coordinates TDASE and TDBSE identifying the geographic location southeast of the geographic location identified via the location coordinates TDAIS and TDBIS, the location coordinates TDAS and TDBS identifying the geographic location south of the geographic location identified via the location coordinates TDAIS and TDBIS, the location coordinates TDASW and TDBSW identifying the geographic location southwest of the geographic location identified via the location coordinates TDAIS and TDBIS, the location coordinates TDAW and TDBW identifying the geographic location west of the geographic location identified via the location coordinates TDAIS and TDBIS, and the location coordinates TDANW and TDBNW identifying the geographic location northwest of the geographical location identified via the location coordinates TDAIS and TDBIS. It should be noted that the data base mask may include additional location coordinates; however, only eight additional surrounding location coordinates have been shown in FIG. 4 and described above for the purpose of illustration. In addition, it should be noted that, in the embodiment described above, the data base mask consists of the location coordinates TDAIS and TDBIS and the additional location coordinates were determined starting with the location coordinates identifying the geographic location north of the geographic location identified via the time coordinates TDAIS and TDBIS and the additional location coordinates were determined starting with the location coordinates TDAN and TDBN and sequentially moving in a clockwise direction about the geographic location identified via the location coordinates TDAIS and TDBIS.

The data base mask is transmitted along with a command word via the base station 134 and received via the receiver/transmitter 116 at the vehicle unit 100. The data base mask and the command word received via the receiver/transmitter 116 is provided on an output signal path 138 by the receiver/transmitter 116, the signal on the output signal path 138 being received via the processor 106. In response to receiving the data base mask and command word on the signal path 138, the processor 106 stores the received data base mask consisting of the following location coordinates: TDANW, TDBNW and TDAN, TDBN and TDANE, TDBNE and TDAW, TDBW and TDAIS, TDBIS and TDAE, TDBE and TDSW, TDBSW and TDAS, TDBS and TDASE, TDBSE. In response to the command word transmitted by the base station 134 along with the data base mask, the processor 106 operates to store the received data base mask in the memory unit 112, the data base mask being provided via the processor 106 to the memory unit 112 via an output signal on a signal path 140. Further, in response to receiving the command word, the processor 106 operates to store the location coordinates TDAIS and TDBIS in the location registers 110 and then to initiate the vehicle location process to be described in greater detail below.

Figure 5:
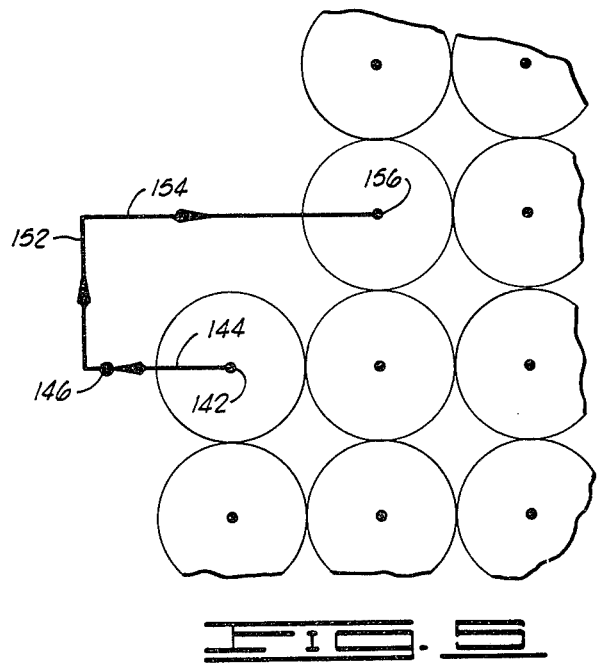
FIG. 5 is a diagrammatic view of a portion of a data base region illustrating some aspects of the system of the present invention.

Referring to FIG. 5, assume that a particular vehicle has started at the geographic location 142 and then the particular vehicle travels in a direction along a path of travel identified in FIG. 5 via the reference numeral 144 to and through a geographic location 146. The geographic location 142 is identified via the location coordinates TDAIS and TDBIS, the first location coordinates received via the vehicle unit 100 in this example. The geographic location 146 is located outside the data base region as illustrated in FIG. 5 or, in other words, the geographic location 146 is located in an area where the specific base location coordinates have not been determined. When the vehicle is located at a geographic location outside the data base region, the processor 106 functions to condition the vehicle unit 100 in an initialization phase.

After the vehicle unit 100 has been initialized (after the data base mask has been stored in the memory unit 112 of the vehicle unit 100) the vehicle unit 100 automatically starts determining subsequent geographic locations of the vehicle unit 100 or, more particularly, the monitored vehicle having the vehicle unit 100 located therein. With respect to determining subsequent geographic locations of the vehicle or vehicle unit 100, the transmit signals are received via the receiver 102 and the time difference values are provided via a signal on the signal path 130 to the processor 106, the processor 106 operating to store the received time difference values in the time register 108 and to transfer the received time difference values to the location register 110 in a manner described before. Each of the location coordinates stored in the location register 110 is compared with the location coordinates stored in the memory unit 112 to determine the values of the location coordinates in the memory unit 112 which are the closest to the location coordinates in the location register 110, the location coordinates stored in the memory unit 112 being those base location coordinates comprising the data base mask.

After the vehicle unit 100 has been initalized in the manner described above, the vehicle unit 100 automatically starts calculating or determining a new location. Assuming the location coordinates in the location register 110 are identified as TDAT and TDBT and the location coordinates stored in the memory unit are identified as TDAM and TDBM, the location coordinates TDAM and TDBM which are the closest to the location coordinates TDAT and TDBT are determined by first determining the smallest value of TE which is greater than a predetermined value of TE in accordance with the following expression (the value of TE being the same as the value of RI described before):

$$[(TDAM-TDAT)^2+(TDBM-TDBT)^2]^{\frac{1}{2}}=TE \qquad (2)$$

Each value of TE determined in accordance with the expression (2) above is compared with a predetermined value of TE which corresponds to a determined location radial error and the smallest value of TE which is greater than the predetermined value of TE is determined, the value being designated TES. After the value TES has been determined, the particular location coordinates TDAM and TDBM in the memory unit 112 which were utilized in expression (2) above to determine the value TES are provided via a memory unit 112 output signal on a signal path 150. The location coordinates TDAM and TDBM on the signal path 150 are received by the processor 106 and the processor 106 operates to store the received values of TDAM and TDBM in the location register 110. Then, the processor 106 provides the location coordinates TDAM and TDBM in the location register 110 via an output signal on the signal path 132 to the receiver/transmitter 116, the receiver/transmitter 116 operating to provide the received location coordinates TDAM and TDBM via an output signal to the base station 134. If the value TES cannot be determined, the processor 106 provides an output signal on the signal path 137 and the receiver 112 determines additional location coordinates in response to receiving the signal on the signal path 137.

In one form, the location coordinates in the location register 110 can be provided by the vehicle unit 100 in response to receiving a command signal from the base station 134. In one other form, the vehicle unit 100 can be constructed to provide the location coordinates in the location register 110 in response to a different location coordinate being stored in the location register 110.

The output signal provided via the receiver/transmitter 116 also is encoded with a vehicle identification code uniquely identifying the particular vehicle in which the vehicle unit 100 is located in addition to the location coordinates received from the location registers 110. Thus, the output signal provided via the receiver/transmitter 116 includes the location coordinates and the vehicle code. The vehicle unit 100 output signal encoded with the location coordinates and the vehicle code is received via the base station 134 and the location coordinates are compared with the base location time coordinates in the base station 134 memory unit to identify and determine the corresponding geographic location. Thus, the base station 134 can identify the particular vehicle via the vehicle code and the geographic location of the particular vehicle via the received location coordinates.

When the location of a particular vehicle identified via the location coordinates received via the base station 134 is determined to be different with respect to the last received vehicle location, a new data base mask is generated by the base station 134 in a manner like that described with respect to FIG. 4. With respect to the new data base mask, the center location is changed from TDAIS and TDBIS to the new TDAM and TDBM location coordinates reported by the vehicle unit 100. The new data base mask is transmitted via an output signal from the base station 134 to the vehicle unit 100 and stored in the memory unit 112 of the vehicle unit 100 in a manner like that described before, the vehicle location update continuing in a manner described before.

When the vehicle moves to the position 146, as shown in FIG. 5, the time data values or received location coordinates being stored in the time register 108 are such that the values TE determined via expression (2) above are greater than the predetermined value TE for every set of base location coordinates TDAM's and TDBM's stored in the memory unit 112 as the data base mask, including the location coordinates TDAIS and TDBIS. Thus, at the geographical location 146 where the vehicle unit 100 is located outside the data base region, the location coordinates being stored in the time register 108 will not allow any of the base location coordinates TDAM and TDBM to be defined as satisfying the requirements of expression (2) above to determine TES. When this condition occurs, the processor 106 operates to cause the location coordinates TDAT and TDBT in the location register 110 to be transmitted back to the base station 134 via the receiver/transmitter 116. Since the location coordinates do not compare with the last known geographical location of the vehicle unit 100 as identified via the last received location coordinates, it can be determined via the computer at the base station 134 that the vehicle unit 100 either has left the data base region or has been turned off and reinitialized. In either event, the computer at the base station 134 functions in a manner like that described before with respect to the initialization procedure except the geographical location of the vehicle unit 100 is maintained at the location 142 identified via the location coordinates TDAIS and TDBIS.

When the vehicle travels along the paths of travel 146, 152 and 154 to a geographical location 156, as shown in FIG. 5, the vehicle or vehicle unit 100 re-enters the data base region. The new location coordinates corresponding to the base location coordinates identifying the geographical location 156 are inserted into the vehicle unit 100 along with a new data base mask following the procedure described before with respect to the initialization of the vehicle unit 100.

The vehicle unit 100 includes the auxiliary navigation systems 120 which may be desired in some systems and, if so desired the signal path 160 provides communication between the systems 160 and the processor 106. The navigation systems 120 might include such systems as generally known in the art as local dead reckoning systems, for example, for use when the vehicle is located outside the data base region, such as at the geographic location 146 in FIG. 5, for example. Such additional navigational systems are well known in the art and a detailed description of the various systems is not required herein. It also should be noted that such additional navigation systems are generally considered to be of relatively little value outside the data base region since the geographic locations outside the data base regions are not known. Thus, in the preferred embodiment of the present invention, such auxiliary navigation systems are not included and such systems have been shown in FIG. 3 merely for illustration since they may be desired in some applications.

The radius of the circles shown in FIG. 5 corresponds to the value TE. The radius of the circles shown in FIG. 5 and the spacing between the geographical locations identified via base location coordinates in accordance with the present invention are determined via the location accuracy requirements in a particular system. One practical location accuracy would be 1,000 feet which would give TE values of 500 feet with a 1,000 foot spacing between the identified geographic location. For example, a city the size of Los Angeles, California, could be quantized in about two weeks using two people and a van containing a receiver constructed like the vehicle unit 100 shown in FIG. 3. The data base region in this example would include about 10,000 geographic locations identified via base location coordinates and the data base region would encompass an area of about 400 square miles. The 10,000 geographic locations identified via base location coordinates would be equivalent to 10,000 signpost units installed at the same geographic locations, and yet the same number of geographic locations are identified in accordance with the present invention as in the present signpost unit systems at subsequently less installation and maintenance costs.

The present system utilizes all of the base location coordinates to quantize location resolution cells rather than attempting to correct the theoretical time values which should be at or near such locations.

The system of the present invention is suitable for use in inverse hyperbolic as well as the hyperbolic location system described herein. In an inverse hyperbolic system, the data base mask in the vehicle unit is not required, but the vehicle unit must transmit to the receiver triad quite frequently to achieve substantially the same accuracy and reliability. In this instance, the signal transmitted via the vehicle unit is received via three antennas and the signals received via the three antennas are analyzed to determine either the time difference values or the phase difference values. The time or the phase difference values are utilized to determine the location coordinates and the location coordinates are utilized in a manner generally described before to determine the geographical location of the object or vehicle within the data base region. As mentioned before, the changes necessary to adapt the present system to other radio frequency triangulation systems will be apparent to those skilled in the art in view of the detailed description contained herein.

It should be noted that, although the location coordinates have been described herein in connection with the time difference values, the term "location coordinates" is intended to include phase angle differences.

It should be noted that the received location coordinates are sometimes referred to herein as (TDAR) and (TDBR) to distinguish such location coordinates.

Changes may be made in the various components or in the steps of the method described herein without departing from the spirit and the scope of the invention as defined in the following claims.

What is claimed is:

1. A radio frequency triangulation object location method for identifying the location coordinates of predetermined known geographical locations within a data base region wherein signals are transmitted via a vehicle unit for reception via at least three antennas, the method comprising the steps of:

positioning the vehicle unit at each of the known predetermined geographical locations within the data base region;

transmitting signals for reception by the antennas from the vehicle unit at each of the predetermined geographical locations; and determining base location coordinates for each of the known predetermined geographical locations within the data base region in response to the signals transmitted via the vehicle unit at each of the predetermined geographical locations, wherein the signal strength of the signals received by each antenna exceeds a predetermined minimum level.

2. The method of claim 1 defined further to include the steps of:

identifying the location of vehicle units within the data base region, comprising the steps of:
transmitting signals for reception via the antennas from the vehicle unit;
determining the location coordinates in response to the signals transmitted via the vehicle unit; and
comparing the location coordinates determined in response to the signals transmitted via the vehicle unit with the base location coordinates to determine the geographic location of the vehicle unit within the data base region.

3. The method of claim 2 wherein the step of comparing the location coordinates with the base location coordinates is defined further to include the step of:
determining the geographical location of the vehicle unit to be at the geographical location identified via the base location coordinates which are the closest to the location coordinates determined in response to the signals transmitted via the vehicle unit.

4. A radio frequency triangulation object location method for identifying the location coordinates of predetermined known geographical locations within a data base region wherein signals are transmitted via more than one transmit station, the method comprising the steps of:
positioning a receiver at each of the known predetermined geographical locations within the data base region;
receiving at the receiver at each of the predetermined geographical locations the signals transmitted by the transmit stations; and
determining base location coordinates for each of the known predetermined geographical locations within the data base region in response to the signals received at the receiver from the transmit stations wherein the signal strength of each of the signals received by the receiver exceeds a predetermined minimum level.

5. The method of claim 4 wherein the step of determining the base location coordinates is defined further to include the steps of:
determining the time difference value (TDA) from the signals received via the receiver from two of the transmit stations at each of the predetermined geographical locations within the data base region; and
determining the time difference value (TDB) from the signals received via the receiver from two of the transmit stations at each of the predetermined geographical locations within the data base region, the two time differences (TDA) and (TDB) establishing the base location coordinates.

6. The method of claim 5 wherein the step of comparing the received location coordinates with the base location coordinates is defined further to include the step of:
identifying the geographic location of vehicle units within the data base region, comprising the steps of:
receiving at the vehicle unit the signals from the transmit stations;
determining the time difference value (TDAR) from the signals received from two of the transmit stations;
determining the time difference value (TDBR) from the signals received from two of the transmit stations, the two time difference values establishing the received location coordinates (TDAR) and (TDBR);
comparing the received location coordinates (TDAR) and (TDBR) with the previously determined base location coordinates (TDA and (TDB); and
determining the geographical location of the vehicle unit to be at the geographical location identified via the base location coordinates (TDA) and (TDB) which compares the closest with the received location coordinates (TDAR) and (TDBR).

7. The method of claim 6 wherein the step of comparing the received location coodinates (TDAR) and (TDBR) with the base location coordinates (TDA) and (TDB) is defined further to include the steps of:
determining values of (RE) for the received location coordinates (TDAR) and (TDBR) and the base location coordinates (TDA) and (TDB), wherein:

$$RE = [(TDA - TDAR)^2 + (TDB - TDBR)^2]^{\frac{1}{2}};$$

determining the smallest value (REIS) of (RE) values which is less than a predetermined value (RI); and
determining the geographical location of the vehicle unit within the data base region to be at the geographical location identified via the base location coordinates (TDA) and (TDB) utilized in determining the value (REIS).

8. The method of claim 1 wherein the step of comparing the base location coordinates and the received location coordinates is defined further to include the step of:
determining the received location coordinates (TDAR) and (TDBR) to represent "Nonvalid Data" in response to a determination that a value of (REIS) cannot be determined for the received location coordinates (TDAR) and (TDBR).

9. The method of claim 5 defined further to include the steps of:
transmitting the base location coordinates from the receiver;
receiving the base location coordinates transmitted via the receiver at a base station; and
storing at the base station the base location coordinates for the predetermined geographic locations within the data base region.

10. The method of claim 9 wherein the step of comparing the received location coordinates with the base location coordinates is defined further to include the steps of:
identifying the geographic location of vehicle units within the data base region, comprising the steps of:

receiving at the vehicle unit the signals from the transmit stations;

determining the first time difference value (TDAI) from the signals received from two of the transmit stations;

determining the first time difference values (TDBI) from the signals received from two of the transmit stations, the two first time difference values establishing the first received location coordinates (TDAI) and (TDBI);

transmitting via the vehicle unit the first received location coordinates (TDAI) and (TDBI);

receiving at the base station the first received location coordinates (TDAI) and (TDBI);

comparing at the base station the first received location coordinates (TDAI) and (TDBI) with the previously determined base location coordinates (TDA) and (TDB); and determining the geographic location of the vehicle unit to be at the geographic location identified via the base location coordinates (TDA) and (TDB) which compares the closest with the first received location coordinates (TDAI) and (TDBI).

11. The method of claim 10 wherein the steps of comparing the first received location coordinates (TDAI) and (TDBI) with the base location coordinates (TDA) and (TDB) is defined further to include the steps of:

determining values of (RE) for the first received location coordinates (TDAI) and (TDBI) and the base location coordinates (TDA) and (TDB), wherein:

$$RE = [(TDA-TADI)^2 + (TDB-TDBI)^2]^{\frac{1}{2}};$$

determining the smallest value (REIS) of (RE) values which is less than a predetermined value (RI); and determining the geographic location of the vehicle unit within the data base region to be at the geographic location identified via the base location coordinates (TADIS) and (TDBIS) utilized in determining the value (REIS).

12. The method of claim 11 defined further to include:

determining the base location coordinates surrounding the base location coordinates (TDAIS) and (TDBIS);

constructing at the base station a data base mask including the base location coordinates (TDAIS) and (TDBIS) and the base location coordinates surrounding the base location coordinates (TDAIS) (TDBIS);

transmitting via the base station the location coordinates comprising the data base mask;

receiving the data base mask at the vehicle unit; and storing in a memory unit at the vehicle unit the data base mask transmitted via the base station, the location coordinates in the memory unit being (TDAM) and (TDBM).

13. The method of claim 12 defined further to include the steps of:

determining at the vehicle unit the time difference value (TDAT) from two of the subsequently received signals from the transmit stations;

determining at the vehicle unit the time difference value (TDBT) from two of the subsequently received signals from the transmit stations, the two subsequent time difference values establishing subsequently received location coordinates (TDAT) and (TDBT);

determining values of (RE) for the location coordinates (TDAT) and (TDBT) and the base location coordinates (TDAM) and (TDBM), wherein:

$$RE = [(TDAM-TDAT)^2 + (TDBM-TDBT)^2]^{\frac{1}{2}};$$

determining the smallest value (REIS) of values (RE) which is less than a predetermined value (RI); and determining the values of (TDAM) and (TDBM) utilized to determine the value (REIS), the values thus (TDAM) and (TDBM) identify the geographic location of the vehicle.

14. The method of claim 13 defined further to include the step of:

transmitting via the vehicle unit the location coordinates (TDAM) and (TDBM); and receiving at the base station the location coordinates (TDAM) and (TDBM) identifying the geographic location of the vehicle unit within the data base region.

15. The method of claim 14 defined further to include the steps of:

comparing at the base station the received location coordinates with the last received location coordinates;

creating a data base mask in response to a comparison indicating a difference between the received location coordinates and the last-received location coordinates, the data base mask comprising the last-received location coordinates and the location coordinates surrounding the last-received location coordinates;

transmitting the data base mask via the base station;

receiving the data base mask at the vehicle unit; and storing the received data base mask in a memory unit in the vehicle unit.

* * * * *

UNITED STATES PATENT AND TRADEMARK OFFICE
CERTIFICATE OF CORRECTION

PATENT NO. : 4,232,317

DATED : November 4, 1980

INVENTOR(S) : Charles C. Freeny, Jr.

It is certified that error appears in the above–identified patent and that said Letters Patent are hereby corrected as shown below:

In Column 1, line 30, delete the word "not".

Signed and Sealed this

Third Day of March 1981

[SEAL]

Attest:

RENE D. TEGTMEYER

Attesting Officer  Acting Commissioner of Patents and Trademarks